J. P. METZGER.
COUPLING.
APPLICATION FILED JULY 9, 1915.
1,186,021. Patented June 6, 1916.
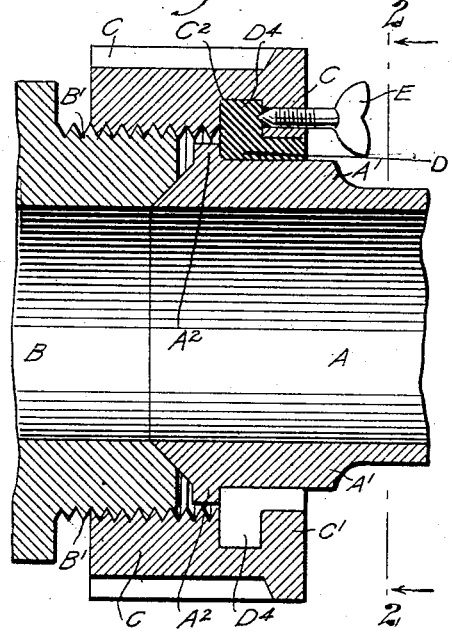
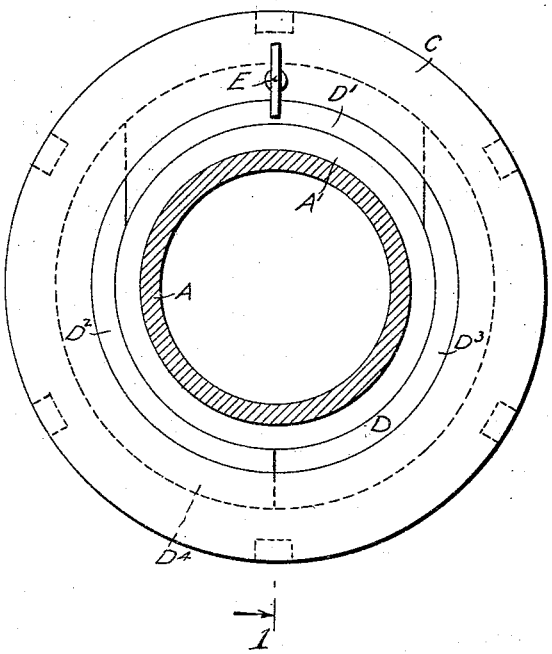
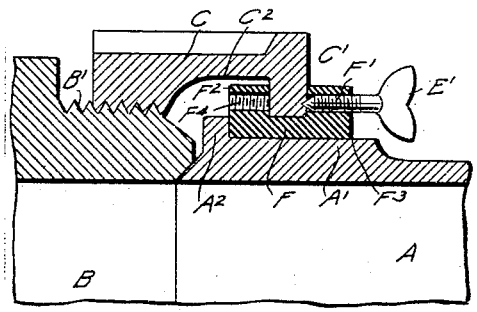
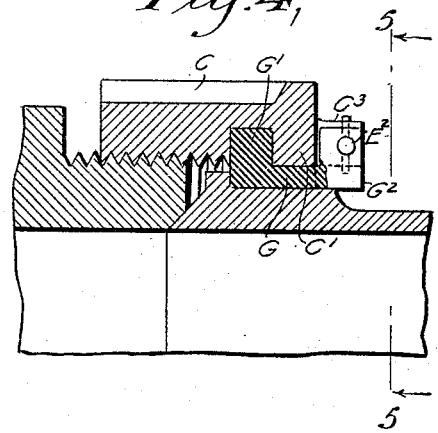
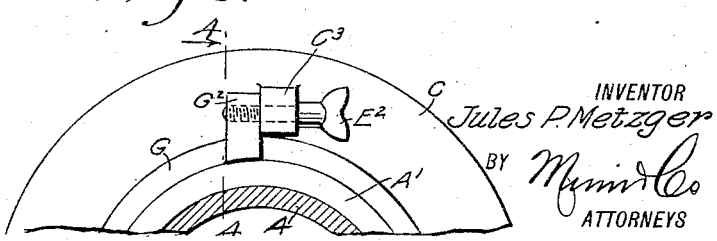
WITNESSES
INVENTOR
Jules P. Metzger
BY
ATTORNEYS

UNITED STATES PATENT OFFICE.

JULES P. METZGER, OF CARLSTADT, NEW JERSEY, ASSIGNOR TO THE LESLIE COMPANY, OF LYNDHURST, NEW JERSEY, A CORPORATION OF NEW JERSEY.

COUPLING.

1,186,021.  Specification of Letters Patent.  Patented June 6, 1916.

Application filed July 9, 1915. Serial No. 38,859.

*To all whom it may concern:*

Be it known that I, JULES P. METZGER, a citizen of the United States, and a resident of Carlstadt, in the county of Bergen and State of New Jersey, have invented new and useful Improvements in Couplings, of which the following is a full, clear, and exact description.

The invention relates to couplings having a sectional coupling ring and such as are used, for instance, for coupling a supply pipe to the injector of a locomotive.

The object of the invention is to provide certain new and useful improvements in couplings of the type referred to whereby the engineer is enabled to readily manipulate the locking device for locking or unlocking the key section of the locking ring.

In order to accomplish the desired result, use is made of a coupling nut having an internal flange and a locking ring made in sections, of which one is the key section, and a rigid fastening device for fastening the said key section to the internal flange.

A practical embodiment of the invention is represented in the accompanying drawings forming a part of this specification, in which similar characters of reference indicate corresponding parts in all the views.

Figure 1 is a longitudinal central section of the coupling provided with the improvements, the section being on the line 1—1 of Fig. 2; Fig. 2 is a cross section of the same on the line 2—2 of Fig. 1; Fig. 3 is a longitudinal central section of a modified form of the coupling; Fig. 4 is a similar view of another modified form of the coupling, the section being on the line 4—4 of Fig. 5; and Fig. 5 is a cross section of the same on the line 5—5 of Fig. 4.

The member A to be coupled to the member B is provided at its coupling end with a head A′ having a shoulder A², and the member B is provided with an external screw thread B′ on which screws the coupling nut C. The outer end of the coupling nut C is provided with an inwardly extending annular flange C′ and with a recess C² intermediate the flange C′ and the threaded portion of the nut C. A locking ring D fits on the head A′ and is adapted to abut against the shoulder A², and the said locking ring D is formed of sections D′, D² and D³, of which the section D′ is the key section and serves to hold the other sections in place. The locking ring D shown in Figs. 1 and 2 is provided with an annular outwardly extending flange D⁴ fitting into the recess C² and abutting against the inner side of the annular flange C′ so that when the nut C is screwed up or unscrewed the ring D moves in a longitudinal direction with the said nut. When the nut C is unscrewed and the locking ring D is moved off the head A′ then the key section D′ can readily drop out to permit of removing the locking ring for the time being, that is, until the repairs are made. Normally, however, the locking ring is fastened in place in the nut C and for this purpose use is made of a fastening device, preferably a set screw E, screwing in the flange C′ and engaging the flange D⁴ at the key section D′. When it is desired to remove the ring D, as previously mentioned, it is necessary for the engineer to first retract the set screw E to disengage the latter from the flange D⁴ of the key section D′.

In the modified form shown in Fig. 3, the sectional ring F is provided with two annular flanges F′, F² straddling the internal flange C′ of the coupling nut C, and in order to hold the key section of this ring F in place use is made of a set screw E′ which screws into either of the threaded apertures F³ and F⁴ formed in the corresponding flanges F′ and F². By the arrangement described, the locking ring F can be reversed and the screw E′ engaged with the aperture F³ or F⁴ outermost at the time, it being understood that the screw screws against the flange C′ to fasten the key section in place.

In the modified form shown in Figs. 4 and 5, the sectional ring G is similar to the ring D shown in Figs. 1 and 2, and the nut C is also like the nut shown in Figs. 1 and 2. In this case the key section of the sectional ring G is provided at its outer side with a lug G² in which screws a set screw E² mounted to turn in a lug C³ formed on the outer side of the nut C. Thus by the arrangement described, the key section of the locking ring G is securely fastened in position on the nut C′, but on unscrewing the said screw E² the key section can be readily removed from the remaining sections on retracting the nut C, as previously explained.

From the foregoing it will be seen that by the arrangement described, the engineer can readily unfasten the key section to allow removal of the sectional ring from the coupling nut whenever it is desired to disconnect the parts for repairs or other purposes. In a like manner, the sections of the locking ring can be readily assembled and placed in position on the nut C and fastened thereto by the set screw E, E′ or E².

Having thus described my invention, I claim as new and desire to secure by Letters Patent:

1. A coupling, comprising a coupling nut provided with an internal flange, a locking ring made in sections, of which one is the key section, the said locking ring having an external flange engaging the said internal flange, and a fastening device for fastening the said flanges together.

2. A coupling, comprising a coupling nut provided with an internal flange, a locking ring made in sections, of which one is the key section, the said locking ring having an external flange engaging the said internal flange, and a set screw screwing in one of the flanges and engaging the other flange.

3. A coupling, comprising a coupling nut provided with an internal flange, a locking ring made in sections, of which one is the key section, the said locking ring having an external flange engaging the said internal flange, and a set screw screwing in the said internal nut flange and engaging the said abutting flange of the locking ring.

In testimony whereof I have signed my name to this specification in the presence of two subscribing witnesses.

JULES P. METZGER.

Witnesses:
 THEO. G. HOSTER,
 GEORGE H. EMSLIE.

Copies of this patent may be obtained for five cents each, by addressing the "Commissioner of Patents. Washington, D. C."